Figure 1:
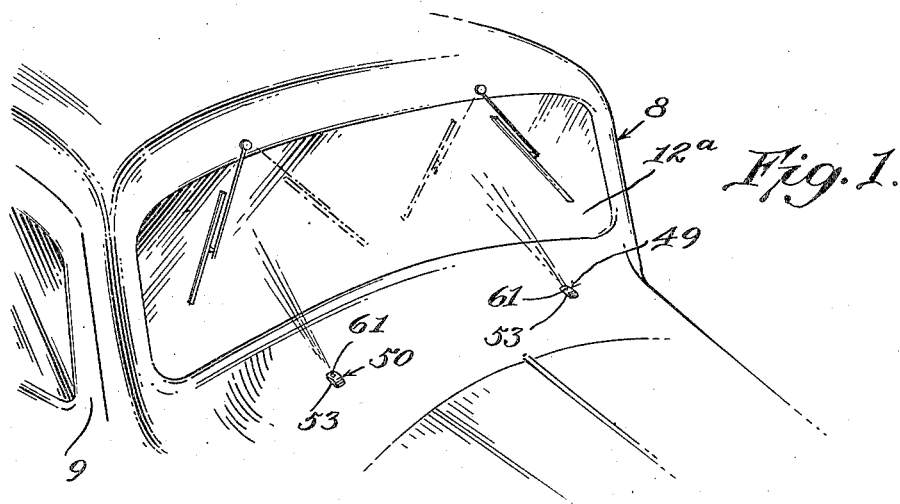

Aug. 9, 1938.  E. J. EADDY  2,126,624
WINDSHIELD CLEANING DEVICE
Filed April 5, 1937  2 Sheets-Sheet 1

INVENTOR.
Ernest J. Eaddy
BY
Kimmel & Crowell ATTORNEYS.

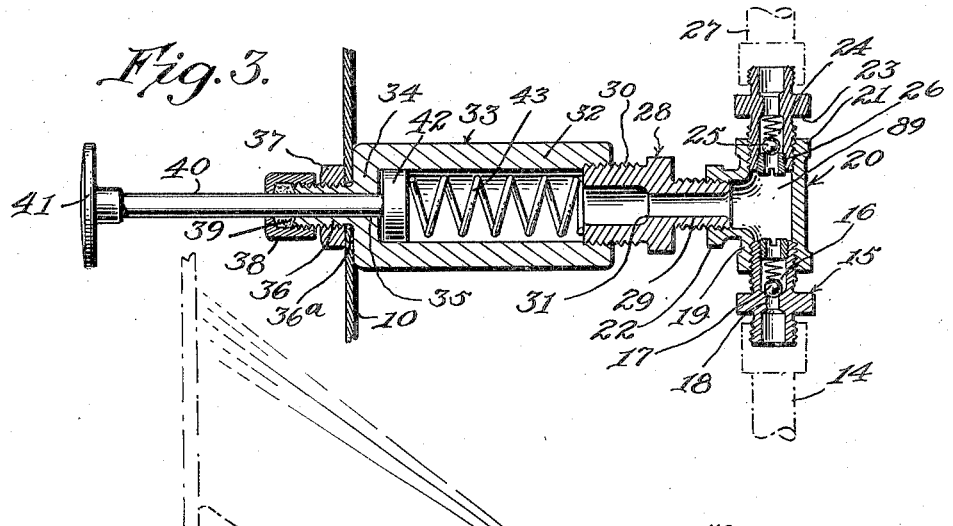
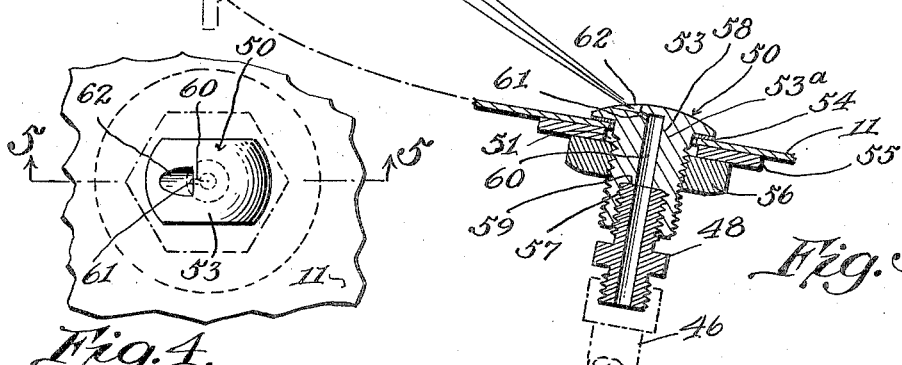
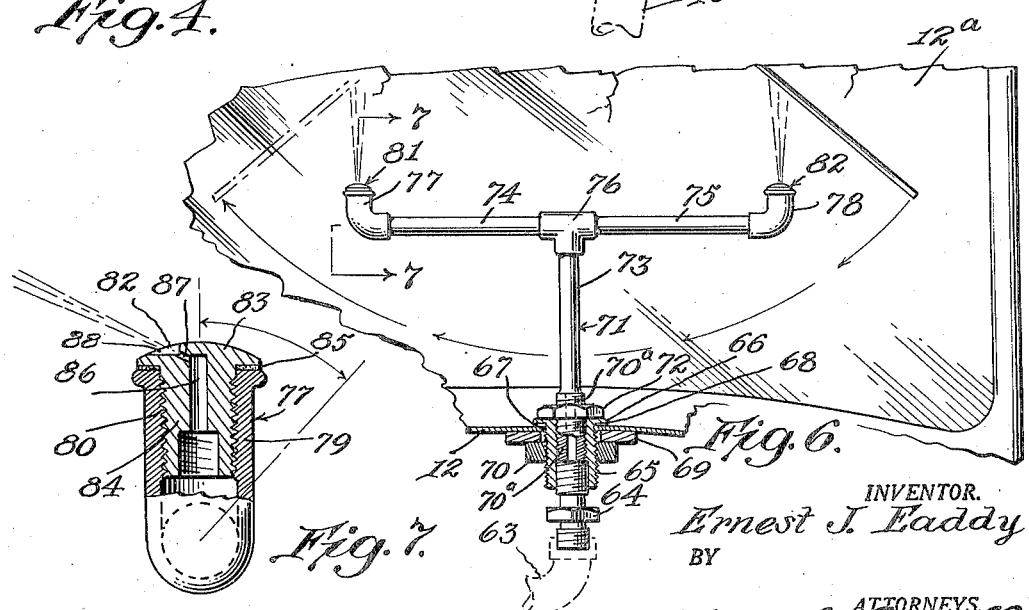

Patented Aug. 9, 1938

2,126,624

UNITED STATES PATENT OFFICE 2,126,624

WINDSHIELD CLEANING DEVICE

Ernest J. Eaddy, Spartanburg, S. C.

Application April 5, 1937, Serial No. 135,149

6 Claims. (Cl. 20—40.5)

This invention relates to a windshield cleaning device and has for its object to provide, in a manner as hereinafter set forth, a normally inactive device of the class referred to for installation in an automotive vehicle forwardly and rearwardly with respect to the windshield of the latter, made active, when occasion requires, from the interior of the vehicle and when active projecting a cleaning liquid rearwardly in a direction to impact against the front of the windshield whereby the said front is cleaned.

A further object of the invention is to provide, in a manner as hereinafter set forth, a normally inactive windshied cleaning device for installation in an automotive vehicle forwardly and rearwardly with respect to the windshield of the latter, made active, when occasion requires, from the interior of the vehicle and when active projecting a liquid possessing a defrosting characteristic, rearwardly in a direction to impact against the front of the windshield whereby the latter is defrosted.

Further objects of the invention are to provide, in a manner as hereinafter set forth, a device of the class referred to which is simple in its construction and arrangement, strong, durable, compact, readily installed with respect to the windshield of an automotive vehicle, thoroughly efficient in its use, conveniently operated, quickly assembled and comparatively inexpensive to manufacture.

To the above ends essentially and to others which may hereinafter appear, the invention consists of the novel construction, combination and arrangement of parts as will be more specifically described and as illustrated in the accompanying drawings, wherein is shown embodiments of the invention, but it is to be understood that changes, variations and modification may be resorted to which fall within the scope of the invention as claimed.

Figure 2:
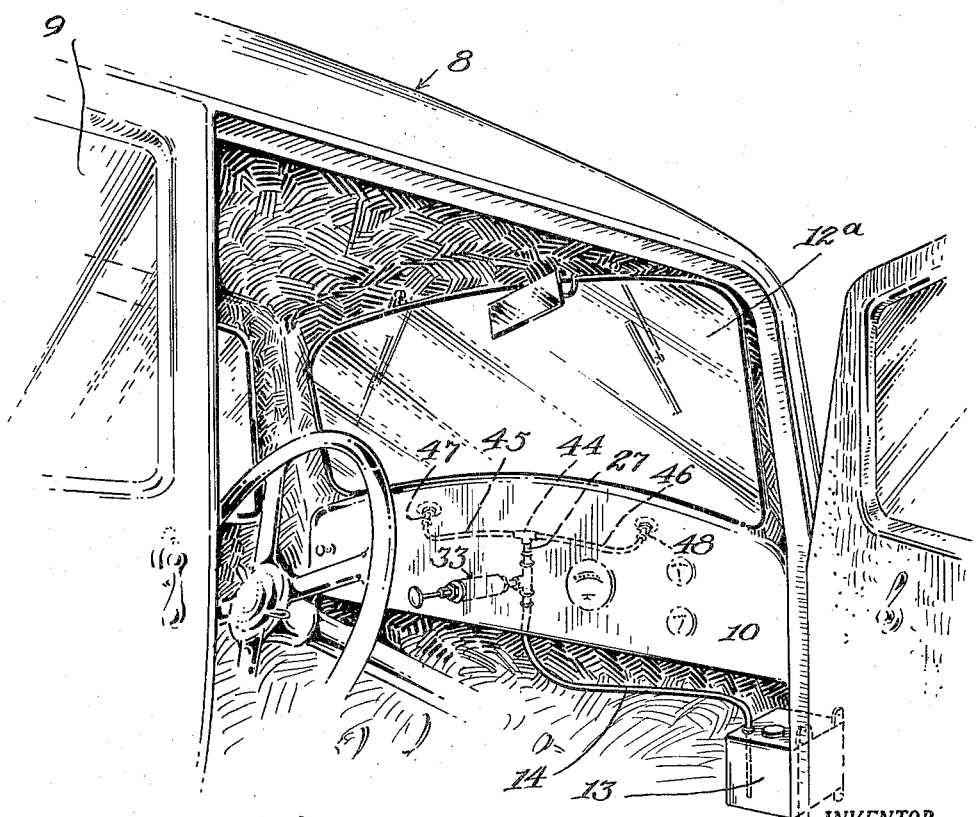

In the drawings:

Figure 1 is a fragmentary view in perspective of an automotive vehicle showing the adaptation therewith of the liquid discharge nozzles of a cleaning device in accordance with this invention, Figure 2 is a fragmentary view in perspective of the closed type body of an automotive vehicle with a door of said body open and showing the arrangement therein of the rear portion of a cleaning device in accordance with this invention, Figure 3 is a fragmentary view of the device in vertical longitudinal section illustrating the pump element and the valve controlled liquid feed and supply lines, Figure 4 is a fragmentary view in top plan illustrating the upper end of the form of the liquid discharge nozzles employed, Figure 5 is a section on line 5—5, Figure 4, Figure 6 is a fragmentary view in elevation of an automotive vehicle body showing the adaptation with respect to the windshield of the vehicle a modified form of cleaning device in accordance with this invention, and Figure 7 is a section on line 7—7, Figure 6.

With reference to Figures 1 and 2 the vehicle is generally indicated at 8 and includes a body 9 of the closed type. Figure 2 illustrates an instrument board 10 arranged within the body 9. The cowl of the vehicle is indicated at 11 on Figures 4 and 5 and at 12 on Figure 6. The windshield is indicated at 12ª Figures 1, 2 and 6.

Figures 1 to 5 illustrate one form of the device and Figures 6 and 7 another or modified form. Each form of the device includes a container 13 for a body of cleaning liquid or fluid. Preferably, the liquid will possess a defrosting characteristic. Extending from the container 13 is a liquid feed line 14 which at its outer end is connected to and opens into the lower end of an annular peripherally flanged housing or coupling 15 constituting a check valve chamber 16 having confined therein a spring controlled ball valve 17 constituting a check. The seat for valve 17 is indicated at 18. The upper end of housing 15 extends into, is secured to and has controllable communication with the lower leg 19 of a vertically arranged T coupling 20 disposed on the bottom edge of the leg 19 and arranged forwardly of the instrument board 10. The upper and intermediate legs of the coupling 20 are indicated at 21, 22 respectively. The leg 21 is arranged over and spaced from leg 19. The leg 22 merges into the rear sides of the legs 19, 21 at the inner ends of the latter and extends rearwardly from legs 19, 21. Arranged over and spaced from housing 15 is an annular peripherally flanged housing or coupling 23 constituting a check valve chamber 24 having confined therein a spring controlled ball valve 25 constituting a check. The seat for valve 25 is indicated at 26. The inner end of housing 23 extends into, is secured to and has controllable communication with the leg 21. Secured to the upper end of housing 23 is a liquid supply line or pipe 27. The seats 18, 26 are arranged within the housings 15, 23 respectively intermediate the ends of the latter. Extending into the rear end of leg 22 and secured to the latter is an annular peripherally flanged tubular coupling element 28 formed of a forward portion 29 and a rear portion 30. The latter is of greater inner and outer diameters than that of the portions 29. The inner diameter of portion 29 is materially less than that of portion 30 and the junction of the two inner diameters provides a shoulder 31. The latter is tapered. Secured upon the rear end of the portion 30 of element 28 is the forward open end of a rearwardly extending cylinder 32 of a pump 33. The cylinder 32 includes a rear axially apertured end 34. The aperture or opening in end 34 is indicated at 35. Formed integral with the rear end 34 of cylinder 32 is a rearwardly extending peripherally threaded annular sleeve 36 which extends through an opening 36ª formed in the instrument board 10. The inner face of sleeve 36 provides a flush continuation of the wall of the aperture or opening 35 in the rear end 34 of cylinder 32. The sleeve 36 carries a clamping nut 37 rearwardly of board 10 which in connection with the rear end 34 of cylinder 32 and the board 10 clamps the cylinder 32 in forward relation with respect to board 10. Secured to sleeve 36 and extending rearwardly therefrom is a packing gland 38 carrying a packing 39 which abuts against the rear end of sleeve 36. Extending through the gland 38, packing 39, sleeve 36, and aperture 35 into the cylinder 32 is a plunger operating rod 40 formed at its rear end with a handle device 41 of disc-like form. The forward end of rod 40 is secured to a plunger head 42 axially of the rear face of the latter. Arranged within the cylinder 32 and interposed between the head 42 and the rear end of portion 30 of element 28 is a coiled controlling spring 43 which normally acts to maintain the head 42 in the position shown in Figure 3.

With reference to the form of the device shown by Figures 1 to 5, it includes an upstanding T-coupling 44 which has its vertical leg attached to the upper end of the supply line or pipe 27, a pair of oppositely disposed liquid conducting lines 45, 46 (Figure 2) which are attached to and extend from the horizontal legs of coupling 44, a pair of peripherally threaded flanged annular couplers 47, 48 (Figure 2) extending into the upper ends, secured to and projecting from the lines 45, 46 respectively, a pair of upstanding forwardly inclined spaced parallel peripherally threaded nozzles 49, 50 passing through spaced aligned openings 51, only one shown (Figure 5) in the cowl 11 and each formed of a rectangular head 52 of segmental contour in lengthwise section arranged over the cowl 11, and an annular body part 53ª (Figure 5) extending inwardly from the head 53, spacers 54 surrounding the said body parts 53ª and interposed between the heads 53 and cowl 11, washers 55 surrounding the body parts 53ª and bearing against the lower face of the cowl 11, and clamping nuts 56 carried by the body parts 53ª, bearing against the washers 55 and in connection with the heads 53, spacers 54 and washers 55 clamp the nozzles to the cowl 11. The body part 53ª of each nozzle is formed of an inner portion 57 of enlarged inner diameter and an outer portion 58 of reduced inner diameter which merges into the inner face of the head of a nozzle. The junction of the portions 57, 58 provides the body parts 53ª of the nozzles with internal shoulders 59. The portion 57 of each body part 53ª is threaded. The upper portions of the couplers 47, 48 extend into and are secured with the portions 57 of the body parts 53ª of the nozzles 49, 50. The upper ends of the couplers 47, 48 when secured to the body parts 53ª of the nozzles 49, 50 abut the internal shoulders formed in said body parts of the nozzles. The inner diameter of the couplers 47, 48 conforms to that of the forward portions 58 of reduced inner diameter of the body parts of the nozzles. The forward portion 58 of the body part 53ª of each nozzle provides a liquid discharge passage 60 which is closed at its upper end by a nozzle head 52 and communicates at a point below and in proximity to the inner face of the nozzle head with a rearwardly extending upwardly inclined outlet port 61 which opens into a cutout 62 formed in and centrally of the rear of the upper surface of the nozzle head. The heads 53 extend laterally in opposite directions with respect to the body parts 53ª of the nozzles.

The form of the device shown by Figures 6 and 7 includes a supply pipe or line 63 of the desired length which is substituted for the supply pipe or line 27. The line 63 is adapted to have its rear end connected to and communicate with the coupler 23 which is attached to the leg 21 of T-coupler 20. The forward end of line 63 is attached to an upstanding coupler 64 (Figure 6) which has its upper portion extend into and connects to the lower portion of a vertically disposed interiorly and exteriorly threaded sleeve 65 formed with a laterally disposed annular flange 66 at its upper end. The sleeve 65 extends through an opening 67 formed centrally of the cowl 12. Interposed between flange 66 and cowl 12 and surrounding sleeve 65 is a spacer or washer 68. Encompassing sleeve 65 in spaced relation thereto and positioned against the lower face of cowl 12 is a washer 69. Threadedly engaging with the outer periphery of sleeve 65 is a clamping nut 70 which in connection with the washer 69, spacer 68 and flange 66 clamps the sleeve 65 to cowl 12. Extending into the upper portion of and threadedly engaging with the sleeve 65 is the enlarged peripherally threaded lower terminal portion 70ª of a vertically disposed T-shaped liquid conducting pipe 71. The portion 70ª of pipe 71 carries a lock nut 72 to abut the upper flanged end of sleeve 65. The pipe 71 includes a vertical section 73 and a pair of oppositely extending inner endwise aligned horizontal sections 74, 75 which are connected at their inner ends with the upper end of section 73 by a T-coupler 76. Secured to the outer ends of the sections 74, 75 of pipe 71 are oppositely disposed hollow elbow-shaped nozzle carrying members 77, 78 of like form. Each nozzle carrying member has its upstanding leg 79 (Figure 7) formed with internal threads 80 for a portion of its length. Secured to the legs 79 of the members 77, 78 are nozzles 81, 82 respectively. The nozzles 81, 82 are of like form and each includes a head 83 of segmental cross section and a peripherally threaded body part 84 of the same form as the body part 53ª referred to. The body part 84 extends into and threadedly engages with the upstanding leg 79 of a nozzle carrying member. The head 83 extends laterally from body part 84. The extended part of head 83 is arranged over the upper end edge of an upstanding leg of a nozzle carrying member and interposed between said leg and extended part is a washer or spacer 85. The nozzles 81, 82 are formed with passages 86 of the same form and arrangement and for the same purpose as the passages 60 referred to. The nozzle 81 or 82 is formed with an inclined part 87 of the same form and arrangement and for the same purpose as a part 61 referred to. The nozzle 81 or 82 has a cutout 88 of the same form and arrangement as a cutout 62.

The housings 15, 23 and the elements carried thereby provide alternately opening controlling valve structures. The cleansing liquid or fluid is termed a cleansing medium. The T-coupling 20 provides a cleansing medium receiving chamber 89 with which the lines 14, 27 and the pump 33 communicate. The line 14 is normally in communication with chamber 89. The line 27 is normally closed to chamber 89. The pump 33 is in permanent communication with chamber 89.

The ports 61, 87 are directed towards the front of windshield and function, when a form is made active, to direct the cleansing liquid to impact in spray-like form the front of the windshield for cleaning it, or when a liquid possessing a defrosting characteristic employed is directed to impact against the front of the windshield by the ports 61, or 87, the windshield will be defrosted.

Either form shown is made active on the operation of the pump 33.

What I claim is:

1. In a cleaning device for the windshield of an automotive vehicle, a nozzle adapted to be anchored with and in extended relation to the cowl of the vehicle forwardly of the windshield to provide for impacting against the latter a cleaning medium, said nozzle including a head having outer and inner faces, said head being formed centrally with a passage closed at its outer end and open at its inner end, said head being formed in the rear portion of its outer face with a rectangular depression spaced from said passage and with a port leading from said passage at a point adjacent the closed end of the latter to the inner end of the depression, said depression being open at its rear, said port inclining upwardly from said passage to said depression, and an annular body integral at one end with the inner face of the head and adapted to be connected with a cleaning medium source, said body having a portion of its inner face corresponding in diameter to that of and forming a flush continuation of said passage.

2. The invention as set forth in claim 1 having said head of segmental contour in lengthwise section, rectangular in plan and of a length to extend forwardly and rearwardly with respect to said body.

3. In a cleaning device for the windshield of an automotive vehicle, a nozzle adapted to be anchored to and in extended relation with respect to the cowl of the vehicle forwardly of the windshield and adapted to provide for impacting the latter with a cleansing medium, said nozzle including a rectangular head for positioning over the cowl, said head being of segmental contour in lengthwise section to provide it with a curved outer face and a flat inner face, said head being formed centrally with an upstanding passage closed at its outer end and opening at its inner end at said inner face, an annular body integral at one end with said inner face, said head including rear and forward portions extending respectively rearwardly and forwardly with respect to said end of said body, the outer face of said head being formed with a depression lengthwise thereof in said rear portion adjacent said passage, said depression being open at its outer side, said head being formed with a port leading from said passage at a point inwardly of the closed end of the latter to the inner end of the depression, said port being inclined upwardly from said passage to said depression, and said body adapted to be connected with a cleaning medium source and having a portion of its inner face corresponding in diameter to and forming a flush continuation of said passage.

4. In a cleaning device for the windshield of an automotive vehicle, a nozzle element for discharging a cleaning medium rearwardly at an upward inclination to impact the front of the windshield, said element being formed with a fluid conducting passage closed at its outer and open at its inner end, said nozzle being formed in its outer end with an external depression gradually decreasing in depth towards and spaced from said passage, said nozzle being formed with a port inclining upwardly from its inner to its outer end, said port having its inner end opening into said passage adjacent the closed end of the latter and its outer end opening into the bottom of said depression, and means for clamping said nozzle stationary in an upstanding position inclining forwardly from its lower to its upper end.

5. In a cleaning device for the windshield of an automotive vehicle, a nozzle element for discharging a cleaning medium rearwardly at an upward inclination to impact the front of the windshield, said element including a body part and a head integral with the outer end of said body part, said element being formed with a fluid conducting passage closed at its outer end and open at its inner end, the closed outer end of said passage being in said head, said head being formed with an external depression spaced from said closed end of the passage and an inclined port opening at one end into said passage at a point spaced from the closed end of the latter and at its other into the said depression.

6. The invention as set forth in claim 5 having said depression gradually decreasing in depth from its outer to its inner end, the depression being open at its outer end and including an inner end wall, a pair of side walls and a bottom, and said port opening into the depression at the junction of said inner wall and said bottom.

ERNEST J. EADDY.